Aug. 25, 1936.   B. M. LEECE   2,052,047
VOLTAGE REGULATION
Filed June 2, 1933   2 Sheets-Sheet 1

Inventor
BENNETT M. LEECE
By Kwis Hudson & Kent
Attorneys.

Aug. 25, 1936.  B. M. LEECE  2,052,047
VOLTAGE REGULATION
Filed June 2, 1933  2 Sheets-Sheet 2

INVENTOR:
BENNETT M. LEECE
ATTORNEYS

Patented Aug. 25, 1936

2,052,047

UNITED STATES PATENT OFFICE 2,052,047

VOLTAGE REGULATION

Bennett M. Leece, Cleveland, Ohio, assignor to The Leece-Neville Company, Cleveland, Ohio, a corporation of Ohio Application June 2, 1933, Serial No. 674,008

14 Claims. (Cl. 171—229)

This invention relates to generating systems of the type adapted for vehicle lighting, battery charging, and other relatively light duty service, and relates more particularly to novel means for regulating the voltage of a shunt generator embodied in such system, so that the terminal voltage of the generator is maintained between relatively close limits at all times regardless of changes in the speed of the generator or variations in the load carried by the generator.

An object of the present invention is to provide an improved form of voltage regulator of the vibratory type having contacts arranged to control the ampere turns of the field for the purpose of maintaining the generated voltage substantially constant and wherein an extremely rapid rate of vibration is obtained with a minimum amount of destructive sparking at the contacts.

Another object of the present invention is to provide improved regulation for a generating system, of the type referred to, wherein means energized from the generator is adapted to intermittently establish a circuit which substantially deenergizes the shunt field winding and thereby varies the ampere turns of the field circuit.

A further object of this invention is to provide an improved voltage regulator of the vibratory type having contact means for varying the ampere turns of a shunt field circuit during one condition of operation of a shunt generator and other contact means for intermittently establishing a circuit which substantially deenergizes the shunt field during another condition of operation of the generator.

Figure 1:
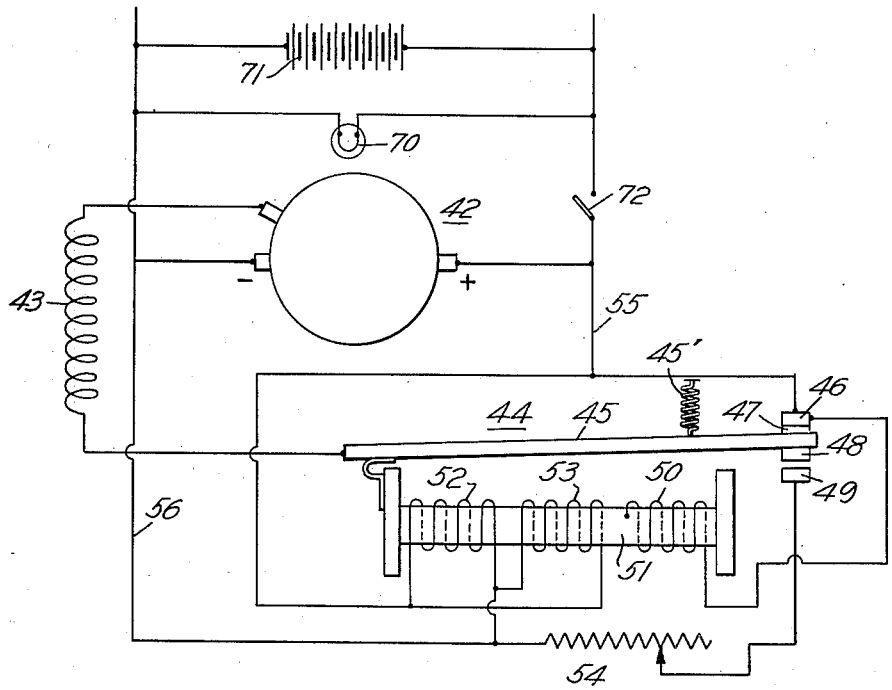

Other objects and advantages of this invention will be apparent from the following description when taken in conjunction with the accompanying sheets of drawings, wherein Fig. 1 is a diagram illustrating a generating system embodying my improved regulating means.

Figure 2:
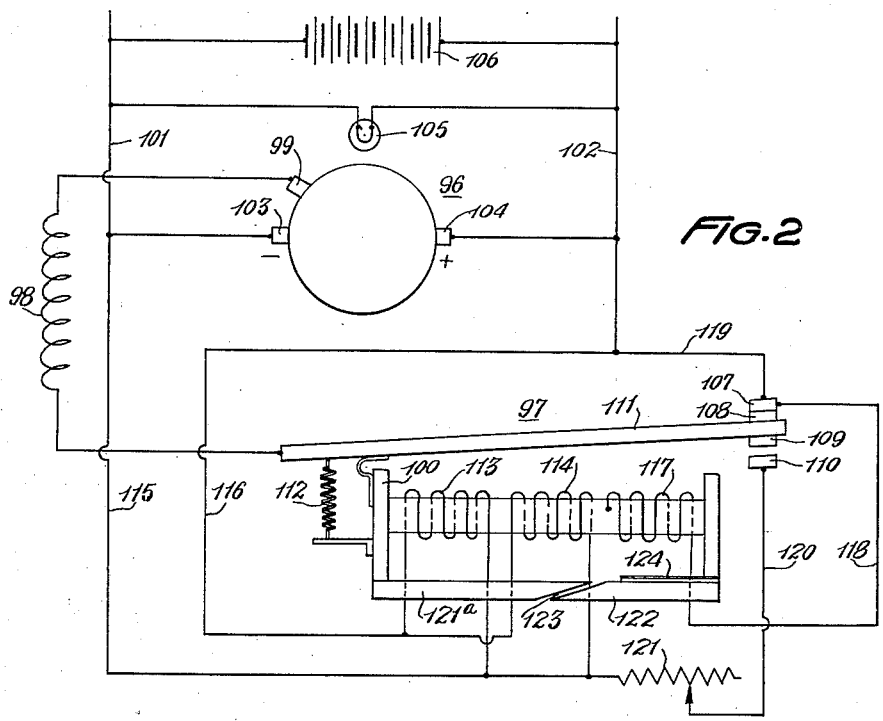
Figure 3:
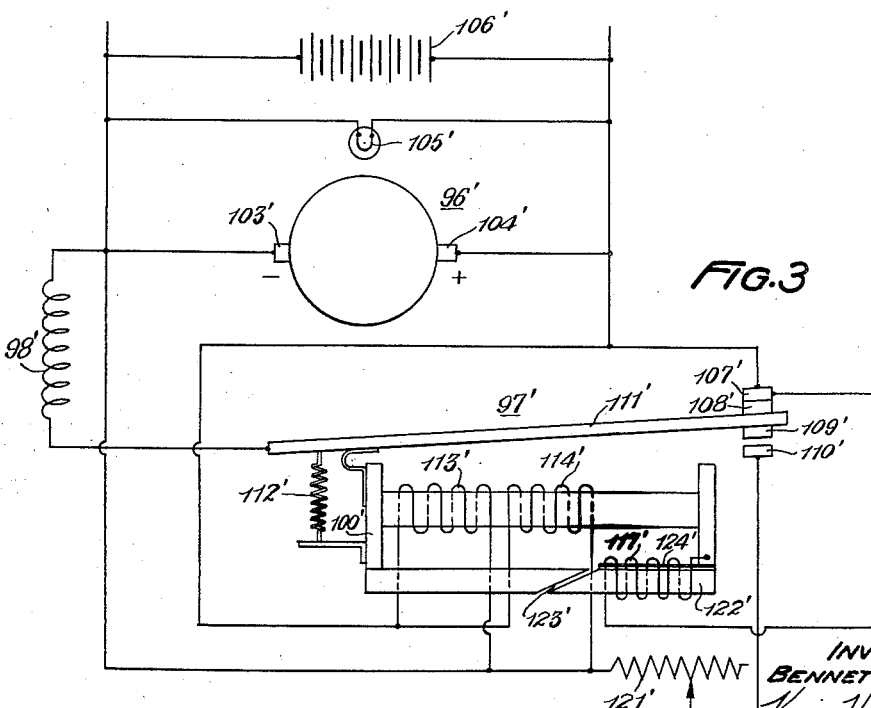

Figs. 2 and 3 are diagrams illustrating other regulator arrangements embodying my invention.

In the accompanying drawings to which detailed reference will presently be made, I have shown the novel voltage regulating means of my invention embodied in generating systems of a type especially suitable for vehicle lighting, battery charging, and other light duty service, but it will be understood, of course, that the invention is not necessarily limited to generating systems of the particular form illustrated in the drawings, but may be embodied in various other arrangements.

Before proceeding with the detailed description of the different generating systems which have been illustrated in the drawings, I wish to point out briefly that, in general, the novel manner of voltage regulation which I have devised is especially applicable to shunt generators and involves the use of means which responds to fluctuations in the terminal voltage of the generator for intermittently establishing a circuit which substantially deenergizes the shunt field winding of the generator. This intermittent deenergizing of the shunt field winding varies the field flux in such a manner that the terminal voltage of the generator is maintained between relatively close limits or, in other words, is maintained substantially constant regardless of changes in the speed at which the generator is driven or variations in the load carried by the generator. My invention also contemplates a reliable and relatively close regulation for the voltage of a shunt generator throughout widely varying speed and load conditions under which the generator may be operated and, to this end, the invention involves the use of means which, during one condition of operation such as when the generator is running at relatively low speeds, varies the ampere turns of the field circuit and, during another condition of operation such as when the generator is running at relatively high speeds, intermittently establishes a circuit which substantially deenergizes the shunt field winding. A significant characteristic of this novel regulating means is that it can be readily applied to shunt generators at the time such generators are initially constructed, and is also adapted to be readily applied to previously constructed shunt generators such as those which have already been embodied in the generating systems of motor vehicles or other apparatus.

Since a large percentage of the generating systems to which my novel regulating means is applicable, such as the generating systems now being used in motor vehicles, embody shunt generators of the third-brush type, I have accordingly illustrated my invention as applied to a generating system embodying a three-brush generator. It should be understood, however, that the invention is not necessarily limited to use with a generator of this type, but it is also readily applicable to systems embodying the conventional two-brush shunt generators.

The generating system illustrated in Fig. 1 includes a shunt generator 42 of the third brush type having a field winding 43, and a vibratory regulator 44 which is operably connected with the generator. This regulator has a vibratory armature 45 and pairs of cooperating contacts consisting, respectively, of the contacts 46 and 47 and the contacts 48 and 49. The armature operates with a rapid vibratory movement and actuates these pairs of contacts. A spring 45' biases the armature in a direction to close the contacts 46 and 47. During normal operating conditions the armature causes rapid opening and closing of the contacts 46 and 47, which as will be presently explained, varies the energization of the shunt field winding 43.

A resistance 50, of suitable value, is provided and is arranged to be intermittently connected into and short-circuited from the field circuit by the opening and closing of the contacts 46 and 47. This resistance is wound on the core 51 of the electromagnet of the regulator.

The energizing winding for the electromagnet of the regulator is in this instance made up of two sections, one being the coil 52, and the other being the coil 53. The coils 52 and 53 are wound on the core in magnetically opposed relation and are made up of wires having different temperature coefficients, that is to say, the wire of coil 52 may be copper wire, and the wire of coil 53 may be iron wire. The temperature coefficient of resistance of the iron wire is high as compared with the temperature coefficient of resistance of the copper wire and, for a given change in temperature, the resistance of the coil 53 is increased to a greater extent than is the resistance of the coil 52. Correspondingly the ampere-turn value of the coil 53 is decreased, for a given temperature change, to a greater extent than the ampere-turn value of the coil 52. Hence when the temperature of the regulator is low the ampere-turn value of the coil 52 is high but is opposed by a high ampere-turn value of the coil 53. When the temperature of the regulator is increased the ampere-turn value of the coil 52 is lowered, but the ampere-turn value of the coil 53 is lowered to a greater extent and it then offers less opposition to the coil 52 than it did at the low temperature. Thus it will be seen, that with the correct relation between these windings, their combined or resultant magnetic action will produce a substantially constant magnetization of the core 51 and the operation of the regulator is substantially independent of temperature changes.

A resistance 54 of suitable value is provided and is adapted to be intermittently connected into a field regulating circuit by the operation of the contacts 48 and 49. When abnormal conditions occur during the operation of the generating system the vibration of the armature 45 is such as to cause a rapid opening and closing of contacts 48 and 49. This results in a substantial short-circuiting of the shunt field winding 43 by a circuit being intermittently established through the resistances 50 and 54. This circuit may be traced from one main brush of the generator through conductor 55, through contact 46 and resistance 50, to the core of the regulator, thence through the regulator and its armature 45 and through the contacts 48 and 49 to the resistance 54. From the resistance 54 the circuit is completed to the other main brush of the generator through conductor 56.

When the contacts 46 and 47 are closed the field winding 43 is connected in a circuit extending across the third brush and one of the main brushes. While these contacts remain closed the field excitation builds up to full strength, which results in an increase in the magnetization of the regulator frame. When the contacts 46 and 47 are opened, by attraction of the armature 45 in opposition to the spring 45', the field circuit is altered to include the resistance 50 in series with the field winding 43. The connecting of the resistance 50 into the field circuit decreases the ampere turns of the field winding 43 and a resulting decrease in the magnetization of the regulator frame allows the spring 45' to shift the armature 45 to again cause the contacts 46 and 47 to be closed.

It will be seen from the arrangement illustrated in Fig. 1 and the operation thereof as just described, that during ordinary or normal operation of the system the contacts 46 and 47 are rapidly opened and closed, and as a result thereof the terminal voltage of the generator is maintained substantially constant. During the occurrence of abnormal operating conditions the contacts 48 and 49 are rapidly opened and closed to produce a more effective regulating action which also causes the terminal voltage of the generator to be maintained substantially constant. When the operating conditions are such as to cause opening and closing of the contacts 46 and 47, the regulating action is accomplished by intermittently connecting the resistance 50 into the field circuit. When operating conditions are such that the operation of the regulator causes opening and closing of the contacts 48 and 49, the regulating action is produced by correspondingly changing from one field circuit to another, that is from a field circuit having the coil 50 in series with the field winding 43 as established by the opening of contacts 48 and 49, to a field circuit having the outer end of the field winding 43 connected to the adjacent main brush as established when these contacts are closed. At the time that the contacts 48 and 49 are closed to establish the last mentioned field circuit, an auxiliary load circuit is also established across the main brushes of the generator. This auxiliary load circuit includes the resistances 50 and 54 therein in series.

It is not altogether necessary that the resistance 50 be wound on the core of the regulator 44 in the arrangement of Fig. 2, but when thus arranged it contributes toward a compact regulator construction. When wound on the regulator core the resistance 50 may be wound in opposition to the coil 52 and the current flowing through the resistance winding produces a demagnetizing action which is beneficial from the standpoint that it tends to increase the efficiency of the regulator.

I wish to point out that the resistance element 54 which is included in the generating system of Fig. 1 is not altogether necessary and, if the terminal voltage of the generator is low enough to be handled by the vibratory contacts without excessive sparking, this resistance element can be omitted. On the other hand, if desired, this resistance element may be a variable resistance, as is represented in Fig. 1 of the drawings, so that the correct value of this resistance can be readily selected when my improved regulator is to be applied to or adapted to a previously installed shunt generator.

In Fig. 1 of the drawings I have shown the load circuit of the generator as including one or more incandescent lamps 70 and a storage battery 71, but the current produced by the generator may, if desired, be used for various other purposes. In the system of Fig. 1, I have shown a simple switch 72 for controlling the load circuit, but it will be understood, of course, that if desired other means may be provided for this purpose, such as any suitable reverse current cutout disclosed in the prior art.

In Figs. 2 and 3 of the drawings I have shown other embodiments of my improved regulating means which are generally similar to the arrangement illustrated in Fig. 1, but which include other novel features. In the arrangement of Fig. 2, I show a shunt generator 96 to which my improved regulating device 97 is operatively connected. In this instance the generator is of the three-brush type having the ends of the shunt field winding 98 connected, respectively, to the third brush 99 and to the frame 100 of the regulator 97. Load conductors 101 and 102 are connected, respectively, to the main brushes 103 and 104 of the generator so that current may be supplied by the generator for operating one or more incandescent lamps 105, for charging a storage battery 106, or for various other purposes.

The regulator 97 is provided with a plurality of pairs of cooperating contacts, one pair comprising contacts 107 and 108 and the other pair comprising contacts 109 and 110. Contacts 108 and 109 are carried by the vibratory armature 111 of the regulator so as to cooperate respectively with the contacts 107 and 110 during the vibration of the armature. A spring 112 normally biases the armature away from the frame 100 tending to cause the contact 108 to engage the contact 107.

The regulator is also provided with a magnet winding comprising coils 113 and 114, both of these coils being connected across the main brushes of the generator by the conductors 115 and 116, the coils 113 and 114 respond to the terminal voltage of the generator and, as changes occur in the voltage due to variations in the speed at which the generator is driven or in the load carried by the generator, or other causes, these coils cooperate with the spring 112 in causing a rapid vibration of the armature 111. A resistance 117, of suitable value, is arranged to be connected into and short-circuited from the field circuit of the generator by the contacts 107 and 108 so as to vary the ampere turns of the field circuit. For the sake of compactness of the regulator, this resistance may be wound on the same core as the coils 113 and 114 and may be wound as a non-inductive winding. In the arrangement illustrated, one end of the winding 117 is connected to the frame of the regulator and the other end of this resistance is connected to the contact 107 by a conductor 118.

From the arrangement as thus far described it will be seen that when the contacts 107 and 108 are closed, such as when the generator is first started up, the resistance 117 is short-circuited from the field circuit, but when the voltage of the generator increases above a desired value, the armature 111 is attracted toward the frame 100 and contacts 107 and 108 are separated. The separation of these contacts places the resistance 117 in circuit with the shunt field 98 causing a decrease in the ampere turns of the field circuit and a decrease in the terminal voltage of the generator. It will be understood, of course, that this opening and closing of the contacts 107 and 108 takes place as a rapid vibration of the armature 111.

When the speed of the generator becomes relatively high, or when large fluctuations occur in the load carried by the generator, the resistance 117 may be inadequate to accomplish the desired regulating action. Accordingly, I provide a second regulating circuit which is controlled by the contacts 109 and 110 and which produces a decrease in the ampere turns of the field circuit by substantially deenergizing the field winding. Thus, when an abnormal change in the speed or load of the generator occurs and the voltage is increased sufficiently to cause the armature 111 to move the contact 109 into engagement with the contact 110, this second regulating circuit is established and may be traced from main brush 104 through conductor 102 and conductor 119 to contact 107. From contact 107 this circuit is continued through conductor 118, resistance 117, then through the frame and armature of the regulator to contact 109 which is then in engagement with contact 110. From contact 110 this circuit continues through conductor 120 and through conductor 115 back to main brush 103. If desired, a resistance 121 may be included in this second regulating circuit if the voltage of the generator is of such a value that destructive sparking would otherwise occur at the contacts. If destructive sparking is not present at the contacts this resistance may be omitted or, if used, may be in the form of a variable resistance, as illustrated, so that the desired resistance value may be readily selected.

As in the case of the regulator illustrated in Fig. 1 of the drawings, the coils 113 and 114 are wound in opposed magnetic relation and may be made up of different kinds of wire. For example, the coil 113 may be wound of copper wire, and the coil 114 may be wound with a wire having a relatively high temperature coefficient of resistance as compared with the copper wire, such as an iron wire. When these coils are properly proportioned their resultant magnetic action, as explained in connection with the coils 52 and 53 of the arrangement illustrated in Fig. 1, produces a substantially constant magnetizing action and the regulator operates substantially independently of temperature changes.

If desired, the iron wire coil 114 could be omitted from the arrangement illustrated in Fig. 2 and the coil 113 could be wound with a wire having substantially a zero temperature coefficient of resistance. Likewise, if desired, the non-inductive resistance 117 may be formed of wire having substantially a zero temperature coefficient of resistance and when the electromagnet of the regulator is made up in this way its operation is substantially independent of temperature changes.

In referring to the coils 113 and 114, I stated above that these coils are connnected across the main brushes of the generator by conductors 115 and 116. It is not necessary, however, that both of these coils be connected to the main brush 103 and, if desired, either of these coils may have one end thereof connected to the third brush 99 instead of the main brush 103 with the result that the coil which is connected to the third brush 99 will be energized with a different potential than the coil which is connected to the brush 103, the difference in potential being represented by the angular spacing of the third brush 99 from the main brush 103.

In Fig. 2 of the drawings I have illustrated another novel feature of my improved regulator, whereby compensation for temperature changes is made by controlling the flux distribution so as to vary the rate of vibration of the armature. According to this manner of compensating for temperature changes I provide the frame of the regulator 97 with a controlled auxiliary flux path in parallel with the flux path through the vibratory armature 111. In this instance the auxiliary flux path is formed by members 121a and 122 of magnet material which are connected to the frame 100 so as to provide a variable air gap 123 between their adjacent ends. One of these members, in this instance the member 122, is connected to the frame in such a manner that its position relative to the other member may be varied by means of a thermally responsive element 124. The thermally responsive element may be a bimetallic strip connected to the member 122 in such a manner that when the temperature of the regulator increases the deflection of the bimetallic strip causes the end of the member 122 to be deflected in a direction relative to the member 121a such as to increase the width of the air gap 123. This variation in the width of the air gap increases the reluctance of the auxiliary magnetic path and more of the flux then passes through the armature 111 tending to cause the contact 109 to be moved in opposition to the spring 112. This increased magnetic attraction acting on the armature 111 increases the regulating action of the device, as explained above, and thereby compensates for an increase in the temperature of the regulator. When the temperature decreases the bimetallic strip 124 is deflected in the reverse direction and decreases the width of the air gap 123 to produce a regulating effect opposite to that just explained.

In Fig. 3 of the drawings I have shown a regulating arrangement which is identical with that illustrated in Fig. 2 with the exception that the shunt generator is a conventional two-brush machine instead of a machine of the third brush type, and the resistance 117', corresponding with the resistance 117 in Fig. 2, is located in adjacent relation to the bimetallic strip 124'. The resistance 117' is preferably, though not necessarily, a non-inductive resistance and may be in the form of a coil surrounding the bimetallic element 124' and the magnetic member 122'. During the operation of the regulator 97' the resistance 117' is utilized to vary the ampere turns of the field circuit, as explained above in connection with Fig. 2, and the current flowing through this winding produces a heating effect on the bimetallic element 124' which results in a compensation for temperature changes through a variation in the width of the air gap 123' as explained above. In arranging the resistance 117' as a coil around the thermally responsive element 124', a quick response can be obtained when temperature changes occur so that compensation will be promptly made for such temperature changes.

In disclosing the use of an auxiliary magnetic circuit having an air gap as a means for compensating for temperature changes, I have described this means in connection with the particular regulator arrangements illustrated in Figs. 2 and 3 of the drawings, but it should be understood that this compensating means may be used with various other forms of regulators, for example it could be embodied in the frame of the regulator shown in Fig. 1 and, likewise, could be applied to the frames of various regulators of the prior art.

From the foregoing description and accompanying drawings, it will now be understood that I have provided novel regulating means of the vibratory type wherein an extremely rapid rate of vibration is obtained with a minimum amount of destructive sparking at the contacts. Moreover it will be seen that my improved device is capable of providing reliable and relatively close voltage regulation in a shunt generator even though the generator be operated under widely varying conditions of load and speed. It is also characteristic of my improved regulator that it is universally applicable to the variety of shunt generators now being supplied for motor vehicle duty and like service, and that it can be readily applied to such generators which are already in service.

While I have illustrated and described the improved regulating means of my invention in a detailed manner, it will be understood, of course, that I do not wish to be limited to the precise details of construction and arrangements of parts illustrated and described, nor to the use of my regulating means with any particular type of generating system, but regard my invention as including such changes and modifications as do not involve a departure from the spirit of the invention and the scope of the appended claims.

Having thus described my invention, I claim:

1. In apparatus of the character described the combination of a generator having a shunt field winding, a magnet having a plurality of coils including a coil energized from the generator, a resistance, vibratory means adapted to be actuated by changes in the magnetization of said coil, contact means controlled by said vibratory means for intermittently connecting said resistance into the field circuit, said resistance constituting one of the coils of said magnet, a second resistance, and other contact means controlled by said vibratory means for intermittently connecting said resistances in series with each other with said second resistance in parallel with the field winding.

2. In apparatus of the character described the combination of a generator having a shunt field winding, a magnet having a coil energized from the generator, a resistance, vibratory means adapted to be actuated by changes in the magnetization of said coil, contact means controlled by said vibratory means for intermittently connecting said resistance into the field circuit, said resistance being wound on said magnet in opposition to said coil, a second resistance, and other contact means controlled by said vibratory means for intermittently connecting said resistances in series with each other and in circuit with the generator.

3. In apparatus of the character described the combination of a generator having a shunt field winding, a regulator having magnet coils including a coil energized from the generator and a movable member adapted to be vibrated by the coil, means normally biasing said member away from the magnet coil, a contact toward which said member is biased and with which said member cooperates during one condition of operation of the generator, a resistance adapted to be intermittently connected into and short-circuited from the field circuit by the cooperation of said member with said contact during said one condition of operation of the generator, said resistance constituting one of the coils of said magnet, a second contact with which said member cooperates during another operating condition of the generator, a second resistance, and circuit connections controlled by the cooperation of said second contact and said member for intermittently establishing a circuit which causes the field winding to be substantially deenergized, said second resistance being included in the last mentioned intermittently established circuit.

4. In apparatus of the character described the combination of a generator having a shunt field winding, a regulator having magnet coils including a coil energized from the generator and a movable member adapted to be vibrated by the coil, means normally biasing said member away from the magnet coil, a contact toward which said member is biased and with which said member cooperates during one condition of operation of the generator, a resistance adapted to be intermittently connected into and short-circuited from the field circuit by the cooperation of said member with said contact during said one condition of operation of the generator, said resistance constituting one of the coils of said magnet, a second contact with which said member cooperates during another operating condition of the generator, said member being normally biased away from said second contact, a second resistance, and circuit connections controlled by the cooperation of said second contact and said member for intermittently establishing a circuit having a portion thereof in parallel with the field winding whereby the latter is substantially deenergized, said second resistance being included in the last mentioned intermittently established circuit.

5. In combination with a generator having a shunt field winding, a regulator comprising a magnet frame having a winding thereon energized from the generator and a vibratory member in the magnetic circuit of the frame, contact means actuated by said vibratory member for intermittently establishing a regulating circuit which varies the ampere turns of said field winding, means providing said frame with an auxiliary magnetic circuit for varying the action of the vibratory member, temperature responsive means for varying the reluctance of said auxiliary magnetic circuit, and a resistance in said regulating circuit arranged to influence the action of said temperature responsive means.

6. In combination with a generator having a shunt field winding, a regulator comprising a magnet frame having a winding thereon energized from the generator and a vibratory member in the magnetic circuit of the frame, contact means actuated by said vibratory member for intermittently establishing a regulating circuit which varies the ampere turns of said field winding, means providing said frame with an auxiliary magnetic circuit for varying the action of the vibratory member, the last mentioned means including portions spaced apart to provide a gap in said auxiliary circuit and one of said portions being shiftable to vary the width of said gap, temperature responsive means for shifting said one portion, and a resistance included in said regulating circuit and arranged to influence the action of the temperature responsive means.

7. In apparatus of the character described the combination of a generator having a field winding, a magnet having energizing coils and a vibratory armature, said coils including a coil energized from the generator and an auxiliary coil, a pair of contacts operated by the armature, circuit connections controlled by said pair of contacts for energizing the field winding independently of the auxiliary winding when closed and in series with the auxiliary coil when open, a second pair of contacts operated by the armature, and circuit connections controlled by the second pair of contacts for substantially deenergizing the field winding and connecting the auxiliary coil in circuit with the generator.

8. In combination, a generator having brushes including main brushes and a third brush and a field winding having one end connected with the third brush, a regulator comprising a magnet having a pair of energizing coils and a vibratory member adapted to be actuated by the magnet, a plurality of pairs of contacts adapted to be operated by said vibratory member, said energizing coils consisting of a voltage coil and an auxiliary coil, circuit connections whereby one pair of contacts when closed connects the other end of the field winding with one of the main brushes for substantially full field excitation and the other pair of contacts when closed connects said other end of the field with the other main brush to substantially deenergize the field winding, and circuit connections for said auxiliary coil whereby the auxiliary coil is connected in series with the field winding when both pairs of contacts are open.

9. In combination, a generator having brushes including a pair of main brushes and a third brush and a field winding with one end thereof connected with the third brush, a regulator comprising a magnet having energizing coils and a vibratory armature adapted to be actuated by the magnet, a pair of spaced contacts, contact means carried by the armature for cooperation with the contacts of said pair, said field winding having its other end connected with the contact means of the armature, the energizing coils of the magnet including a voltage coil and an auxiliary coil having one end connected with one main brush and its other end connected with the contact means of the armature, and means connecting one contact of said pair with said one main brush and the other contact of said pair with the other main brush.

10. In combination, a generator having brushes including main brushes and a third brush and a field winding with one end thereof connected with the third brush, a regulator comprising a magnet having a pair of energizing coils and a vibratory member adapted to be actuated by the magnet, a plurality of pairs of contacts adapted to be operated by said vibratory member, said energizing coils including a voltage coil and an auxiliary coil, circuit connections whereby one pair of contacts when closed connects the other end of the field winding with one of the main brushes for substantially full field excitation and the other pair of contacts when closed connects said other end of the field winding with the other main brush to substantially deenergize the field, and circuit connections for said auxiliary coil whereby the auxiliary coil is connected in series with the field winding when both pairs of contacts are open and is connected in an auxiliary load circuit across the main brushes when said other pair of contacts is closed.

11. In apparatus of the character described the combination of a generator having a field winding, a magnet having energizing coils and a vibratory armature, said coils including a voltage coil energized from the generator and an auxiliary coil wound to magnetically oppose the voltage coil, a pair of contacts operated by the armature, circuit connections controlled by said pair of contacts for energizing the field winding independently of the auxiliary winding when closed and in series with the auxiliary coil when open, a second pair of contacts operated by the armature, and circuit connections controlled by the second pair of contacts for substantially deenergizing the field winding and connecting the auxiliary coil in circuit with the generator.

12. In combination, a generator having brushes including main brushes and a third brush and a field winding having one end connected with the third brush, a regulator comprising a magnet having a pair of energizing coils and a vibratory member adapted to be actuated by the magnet, a plurality of pairs of contacts adapted to be operated by said vibratory member, said energizing coils consisting of a voltage coil and an auxiliary coil wound to magnetically oppose the voltage coil, circuit connections whereby one pair of contacts when closed connects the other end of the field winding with one of the main brushes for substantially full field excitation and the other pair of contacts when closed connects said other end of the field with the other main brush to substantially deenergize the field winding, and circuit connections for said auxiliary coil whereby the auxiliary coil is connected in series with the field winding when both pairs of contacts are open.

13. In combination, a generator having brushes including a pair of main brushes and a third brush and a field winding with one end thereof connected with the third brush, a regulator comprising a magnet having energizing coils and a vibratory armature adapted to be actuated by the magnet, a pair of spaced contacts, contact means carried by the armature for cooperation with the contacts of said pair, said field winding having its other end connected with the contact means of the armature, the energizing coils of the magnet including a voltage coil and an auxiliary coil having one end connected with one main brush and its other end connected with the contact means of the armature, said auxiliary coil being wound to magnetically oppose the voltage coil, and means connecting one contact of said pair with said one main brush and the other contact of said pair with the other main brush.

14. In combination, a generator having brushes including main brushes and a third brush and a field winding with one end thereof connected with the third brush, a regulator comprising a magnet having a pair of energizing coils and a vibratory member adapted to be actuated by the magnet, a plurality of pairs of contacts adapted to be operated by said vibratory member, said energizing coils including a voltage coil and an auxiliary coil wound to magnetically oppose the voltage coil, circuit connections whereby one pair of contacts when closed connects the other end of the field winding with one of the main brushes for substantially full field excitation and the other pair of contacts when closed connects said other end of the field winding with the other main brush to substantially deenergize the field, and circuit connections for said auxiliary coil whereby the auxiliary coil is connected in series with the field winding when both pairs of contacts are open and is connected in an auxiliary load circuit across the main brushes when said other pair of contacts is closed.

BENNETT M. LEECE.